United States Patent
Hormis et al.

(10) Patent No.: US 11,469,874 B2
(45) Date of Patent: Oct. 11, 2022

(54) FULL-DUPLEX WIRELESS COMMUNICATION USING BEAMFORMING

(71) Applicant: QUALCOMM Incorporated, San Diego, CA (US)

(72) Inventors: Raju Hormis, New York, NY (US); Navid Abedini, Somerset, NJ (US); Junyi Li, Chester, NJ (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 16/590,010

(22) Filed: Oct. 1, 2019

(65) Prior Publication Data

US 2021/0099215 A1 Apr. 1, 2021

(51) Int. Cl.
| | |
|---|---|
| *H04L 5/14* | (2006.01) |
| *H04W 16/28* | (2009.01) |
| *H04L 5/00* | (2006.01) |
| *H04B 7/06* | (2006.01) |
| *H04B 7/08* | (2006.01) |

(52) U.S. Cl.
CPC ............. *H04L 5/14* (2013.01); *H04B 7/0617* (2013.01); *H04L 5/003* (2013.01); *H04L 5/0023* (2013.01); *H04W 16/28* (2013.01); *H04B 7/0695* (2013.01); *H04B 7/086* (2013.01)

(58) Field of Classification Search
CPC ....... H04B 7/0617; H04L 5/0023; H04L 5/14; H04L 5/003; H04W 16/28
See application file for complete search history.

(56) References Cited

U.S. PATENT DOCUMENTS

| | | | |
|---|---|---|---|
| 6,514,895 B1* | 2/2003 | Chiu ....................... | C04B 35/16 501/137 |
| 10,356,826 B2* | 7/2019 | Tujkovic ................ | H04W 76/10 |
| 10,615,852 B2* | 4/2020 | Gamand .............. | H01Q 3/2694 |
| 10,951,295 B2* | 3/2021 | Paramesh ............ | H04B 7/0634 |
| 2005/0030227 A1* | 2/2005 | Shamsaifar .............. | H01Q 3/36 342/373 |

(Continued)

OTHER PUBLICATIONS

International Search Report and Written Opinion—PCT/US2020/053724—ISA/EPO—dated Dec. 9, 2020.

(Continued)

*Primary Examiner* — Kevin C. Harper
(74) *Attorney, Agent, or Firm* — Patterson + Sheridan, L.L.P.

(57) ABSTRACT

Certain aspects of the present disclosure provide systems and techniques for full-duplex communication. A first system is characterized by techniques for communicating in full-duplex utilizing the Butler matrix beamformer for generating a spatial beam to be used for both uplink and downlink signaling, wherein the signaling utilizes the same time and frequency resources. A second system is characterized by techniques for communicating in full-duplex utilizing the Butler matrix beamformer to generate two spatial beams, one to be used for downlink and one to be used for uplink signaling, wherein the signaling utilizes the same time and frequency resources. Accordingly, the systems and techniques described herein are directed to low complexity, multi-user full-duplex communications.

16 Claims, 8 Drawing Sheets

(56) References Cited

U.S. PATENT DOCUMENTS

| | | | | |
|---|---|---|---|---|
| 2007/0274372 A1* | 11/2007 | Asai | ............... | H04B 1/525 |
| | | | | 375/130 |
| 2008/0219376 A1* | 9/2008 | Qi | ............... | H04B 7/0632 |
| | | | | 375/285 |
| 2009/0160576 A1* | 6/2009 | Dent | ............... | H01Q 3/40 |
| | | | | 333/139 |
| 2013/0114468 A1* | 5/2013 | Hui | ............... | H04B 17/345 |
| | | | | 370/277 |
| 2015/0092621 A1* | 4/2015 | Jalloul | ............... | H04L 5/1461 |
| | | | | 370/278 |
| 2015/0219752 A1* | 8/2015 | Lewis | ............... | G01S 7/4052 |
| | | | | 342/104 |
| 2016/0087706 A1* | 3/2016 | Guey | ............... | H04L 5/005 |
| | | | | 375/267 |
| 2018/0176897 A1* | 6/2018 | Khan | ............... | H04L 5/14 |

OTHER PUBLICATIONS

Kee A, et al., "Circularly Polarized PIFA Array for Simultaneous Transmit and Receive Application", 2017 IEEE International Symposium on Antennas and Propagation & USNC/URSI National Radio Science Meeting, IEEE. Jul. 9, 2017 (Jul. 9, 2017), pp. 2303-2304. XP033238396, DOI: 18.1109/APUSNCURSINRSM. 2017.8073194 [retrieved on Oct. 18, 2017] the whole document.

Sabharwal A., et al., "In-Band Full-Duplex Wireless: Challenges and Opportunities," IEEE Journal on Selected Areas in Communications, vol. 32. No. 9, Sep. 1, 2014 (Sep. 1, 2014), pp. 1637-1652, XP055580962, US ISSN: 0733-8716, DOI: 10.1109/JSAC.2014. 2330193, the whole document.

* cited by examiner

FULL-DUPLEX WIRELESS COMMUNICATION USING BEAMFORMING

BACKGROUND

Field of the Disclosure

Aspects of the present disclosure relate to wireless communications, and more particularly, to techniques for full-duplex communication at a base station.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, 5G, new radio (NR), to name a few.

In some examples, a wireless multiple-access communication system may include a number of base stations (BSs), which are each capable of simultaneously supporting communication for multiple communication devices (e.g., user equipment (UEs)) using a multi-antenna technology that exploits multipath signal propagation so that the information-carrying capacity of a wireless link can be multiplied by using multiple antennas to send multiple simultaneous streams. The streams may be transmitted to multiple UEs, which is a technique referred to as multi-user multiple-input multiple-output (MU-MIMO). Such systems support bi-directional communications for multiple users by sharing available network resources and communicating using either time division duplexing (TDD) or frequency division duplexing (FDD).

Thus, as the demand for mobile broadband access continues to increase, research and development continue to advance wireless communication technologies not only to meet the growing demand for mobile broadband access, but to advance and enhance the user experience.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for full-duplex wireless communication operable at a base station (BS). The method generally includes receiving, from a user equipment (UE), a first signal communicated via a first directional receive beam using one or more first time resources and one or more first frequency resources. In certain aspects, the method also includes transmitting a second signal to the UE, wherein the second signal is transmitted using the one or more first time resources and the one or more first frequency resources via the first directional transmit beam.

Certain aspects provide an apparatus for full-duplex wireless communication operable at a BS. The apparatus generally includes a memory and a processor communicatively coupled to the memory, wherein the processor is configured to receive, from a UE, a first signal communicated via a first directional receive beam using one or more first time resources and one or more first frequency resources. In some aspects, the processor is further configured to transmit a second signal to the UE, wherein the second signal is transmitted using the one or more first time resources and the one or more first frequency resources via the first directional transmit beam.

Certain aspects provide a non-transitory computer-readable storage medium that stores instructions that when executed by a processor of an apparatus cause the apparatus to perform a method of full-duplex wireless communication operable at a BS. In certain aspects, the method includes receiving, from a UE, a first signal communicated via a first directional receive beam using one or more first time resources and one or more first frequency resources. In certain aspects, the method includes transmitting a second signal to the UE, wherein the second signal is transmitted using the one or more first time resources and the one or more first frequency resources via the first directional transmit beam.

Certain aspects provide for an apparatus for full-duplex wireless communication operable at a BS. In certain aspects, the apparatus includes a means for receiving, from a UE, a first signal communicated via a first directional receive beam using one or more first time resources and one or more first frequency resources. In certain aspects, the apparatus includes a means for transmitting a second signal to the UE, wherein the second signal is transmitted using the one or more first time resources and the one or more first frequency resources via the first directional transmit beam.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
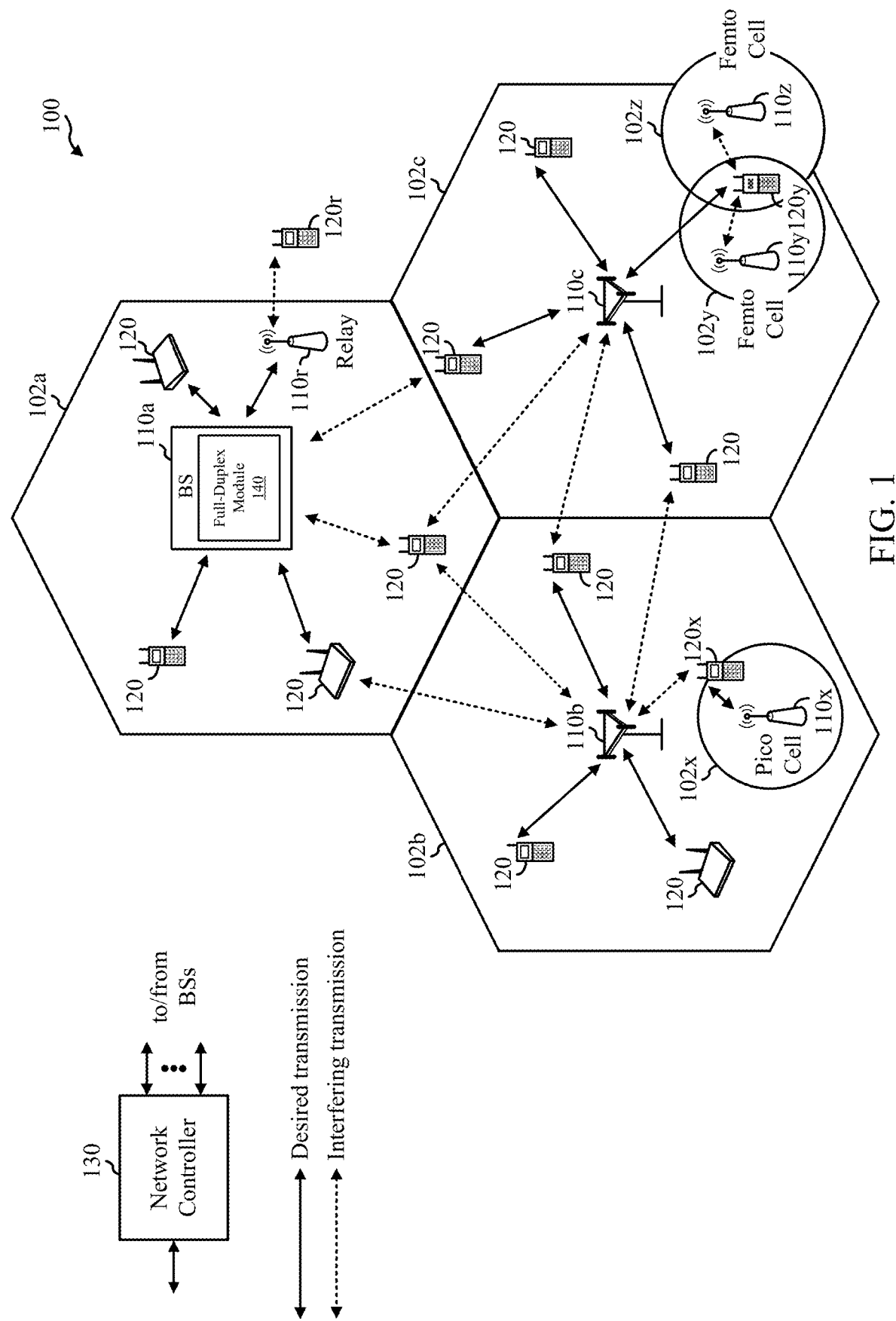
FIG. 1 is a block diagram conceptually illustrating an example telecommunications system, in accordance with certain aspects of the present disclosure.

Aspects of the present disclosure provide apparatus, methods, processing systems, and computer readable mediums for full-duplex wireless communication using beamforming at a base station.

As used herein, a communication is considered to be full-duplex if it supports concurrent transmission and reception using the same time resources. That is, uplink and downlink communications occur at the same time. In some cases, full-duplex communication can be achieved by utilizing different frequency resources for uplink and downlink communications, such as in a frequency division duplex (FDD) system.

Certain aspects herein provide an improvement to such full-duplex communication by utilizing beamforming for full-duplex communication. In particular, in certain aspects, using beamforming for full-duplex communication allows for concurrent transmission and reception using the same time resources and the same one or more frequency resources. Accordingly, different frequency resources are not needed to achieve full-duplex communication, thereby providing more efficient use of wireless communication resources.

In certain aspects, a base station (BS) may have multiple physical antennas used for transmitting and receiving signals. However, the BS may not use each physical antenna separately for transmitting a particular signal or receiving a particular signal. Instead, the BS may combine one or more physical antennas and use the combination of physical antennas as essentially one virtual antenna (e.g., antenna port) for transmission or reception. Further, a given physical antenna may be used as part of multiple virtual antennas.

Certain aspects herein provide techniques that allow at least one virtual antenna to be used for reception of a first signal and another virtual antenna to be used for transmission of a second signal at the same time over the same one or more frequency resources. In certain aspects, as part of combining multiple physical antennas into a virtual antenna, the amplitude gain and/or phase offset applied to signals transmitted/received using each physical antenna may be separately configured (e.g., precoded or controlled) to increase the gain in one or more spatial directions and decrease the gain in one or more other spatial directions such that transmission/reception is essentially beamformed in a particular spatial direction referred to as a directional beam. In certain aspects, from the BS perspective, an uplink signal may be received and a downlink signal may be transmitted using a single beam, or using different beams, utilizing signal filtering and an N×N Butler matrix for beamforming.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). As shown in FIG. 1, the BS 110a includes a full-duplex module 140 configured to enable full-duplex communication using beamforming with each of one or more surrounding users (e.g., user equipment (UEs) 120), according to aspects described herein. In certain aspects, the full-duplex module 140 may include a Butler matrix beamformer configured to generate a spatial beam to be used for both uplink signal reception (e.g., receiving a signal from the UE 120) and downlink signal transmission (e.g., transmitting a signal to the UE 120) for a given UE 120 using the same time and frequency resources. In certain aspects, the full-duplex module 140 is configured to generate two spatial beams, one to be used for downlink signal transmission and one to be used for uplink signal reception for a given UE 120 using the same time and frequency resources.

As illustrated in FIG. 1, the wireless communication network 100 may include a number of base stations (BSs) 110 and other network entities. A BS may be a station that communicates with user equipment (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
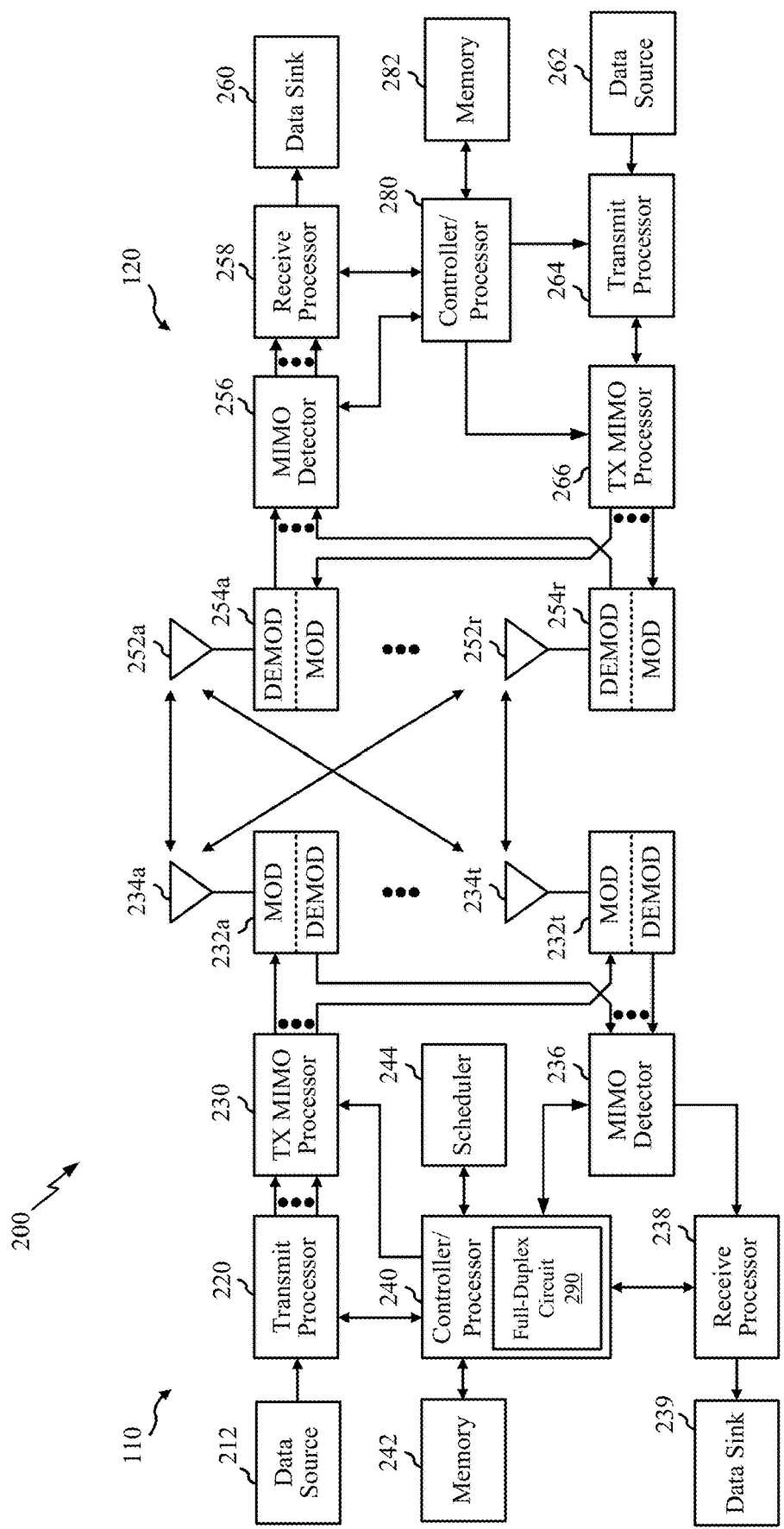
FIG. 2 illustrates example components of a base station (BS) and user equipment (UE), which may be used to implement aspects of the present disclosure.

FIG. 2 illustrates example components 200 of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. As shown in FIG. 2, the BS 110 includes a full-duplex circuit 290 configured to enable full-duplex communication using beamforming with one or more UEs 120, according to aspects described herein. In certain aspects, the full-duplex circuit 290 may include a Butler matrix beamformer configured to generate a spatial beam to be used for both uplink signal reception and downlink signal transmission for a given UE 120 using the same time and frequency resources. In certain aspects, the full-duplex circuit 290 is configured to generate two spatial beams, one to be used for downlink signal transmission and one to be used for uplink signal reception for a given UE 120 using the same time and frequency resources.

In a MIMO system, the BS 110 and the UE 120 include multiple antennas (234a through 234t and 252a through 252r) to generate a plurality of signal paths between the UE 120 and the BS 110. The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the DL. The spatially precoded data streams arrive at the UE(s) with different spatial signatures, which enables each of the UE(s) to recover the one or more data streams destined for that UE. On the UL, each UE transmits a spatially precoded data stream, which enables the base station to identify the source of each spatially precoded data stream.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
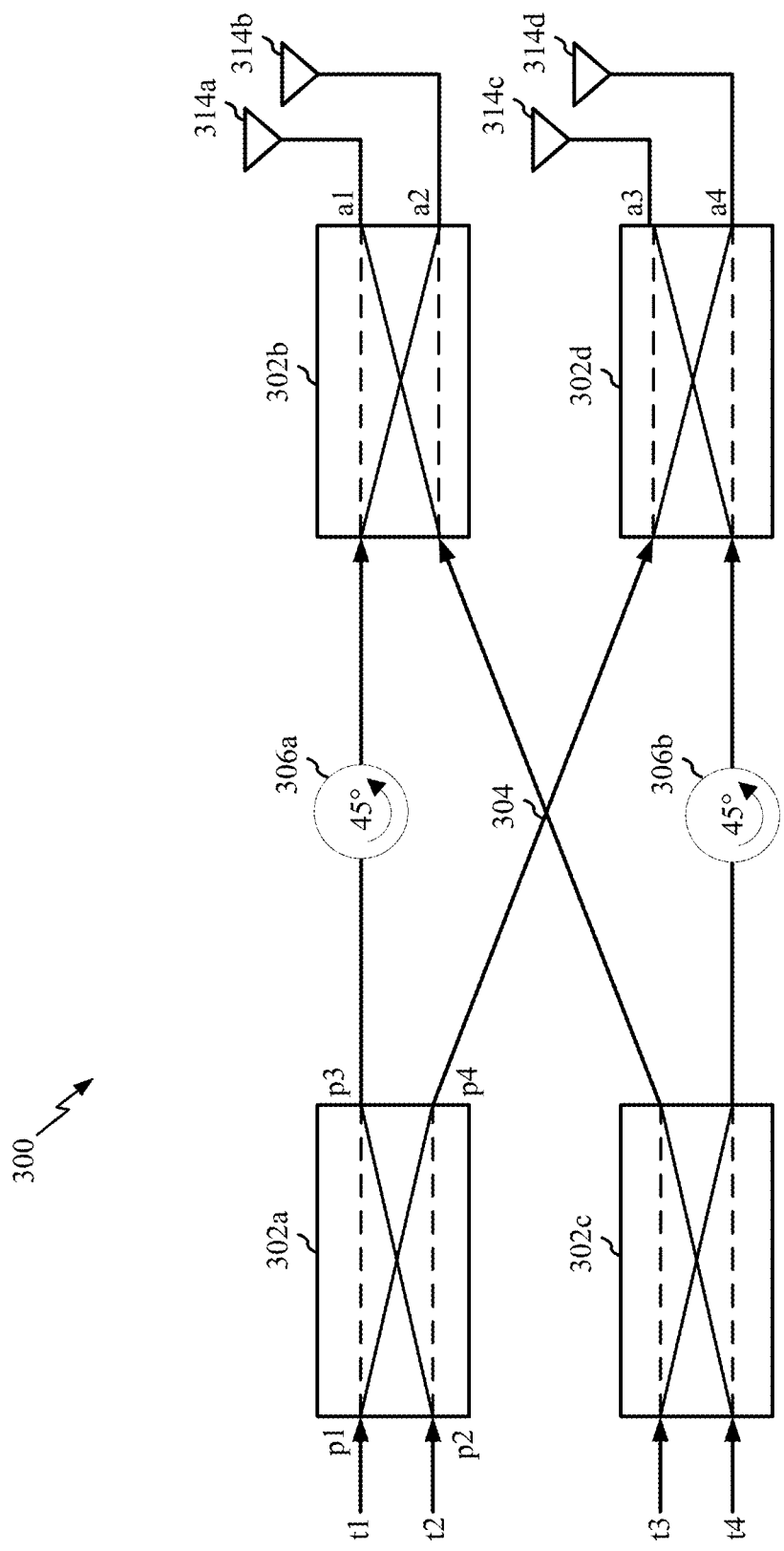
FIG. 3 is a block diagram conceptually illustrating a 4×4 Butler matrix beamformer, in accordance with certain aspects of the present disclosure.

FIG. 3 is a block diagram conceptually illustrating a 4×4 Butler matrix beamformer 300, in accordance with certain aspects of the present disclosure. The beamformer 300 has four 4-port couplers 302a-d. In certain aspects, the couplers are branch-line quadrature couplers. Each of the couplers 302a-d can receive a signal on one of the ports and output a signal shifted by either 0 degrees or 90 degrees on two of the other ports. The 0 degree paths through each coupler 302a-d are indicated by the dashed line through each of the coupler 302a-d. The 90 degree shift paths are indicated by the solid lines through each of the couplers 302a-d. The port numbers for the couplers described will correspond to the first port p1, the second port p2, the third port p3 and the fourth port p4 as shown for coupler 302a. The 4×4 butler matrix also includes a cross-over 304 and 45-degree phase shifters 306a, 306b. It should be noted that a higher order Butler matrix would require different values for the phase shifters.

The coupler 302a has first and second ports connected to first and second terminals t1, t2 which may be referred to as transceiver terminals. A third port of coupler 302a is connected to a first port of coupler 302b via the 45 degree phase shifter 306a. A fourth port of coupler 302a is connected to a first port of coupler 302d via a cross-over 304.

The coupler 302c has first and second ports coupled to third and fourth terminals t3, t4. A third port of coupler 302c is connected to a second port of coupler 302b via cross coupler 304. A fourth port of coupler 302c is connected to a second port of coupler 302d via a 45 degree phase shifter 306b.

The third and fourth ports of coupler 302b are connected to respective antenna terminals a1 and a3. The third and fourth ports of coupler 302d are connected to respective antenna terminals a2 and a4. Antenna terminals a1 to a4 are connected in operation to respective antennas 314a-d.

Figure 4:
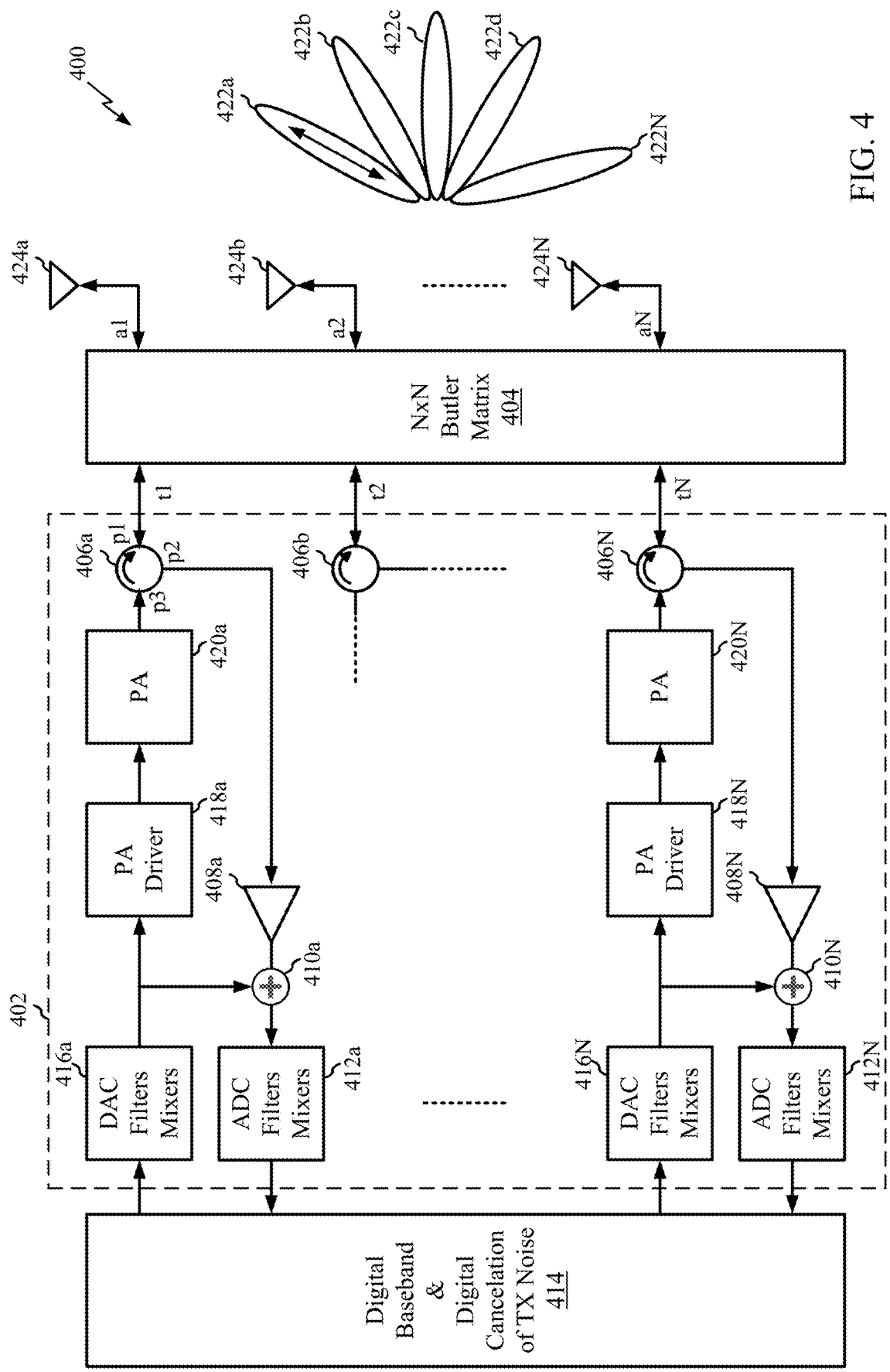
FIG. 4 is a block diagram conceptually illustrating a first transceiver with a Butler matrix beamformer, in accordance with certain aspects of the present disclosure.
Figure 5:
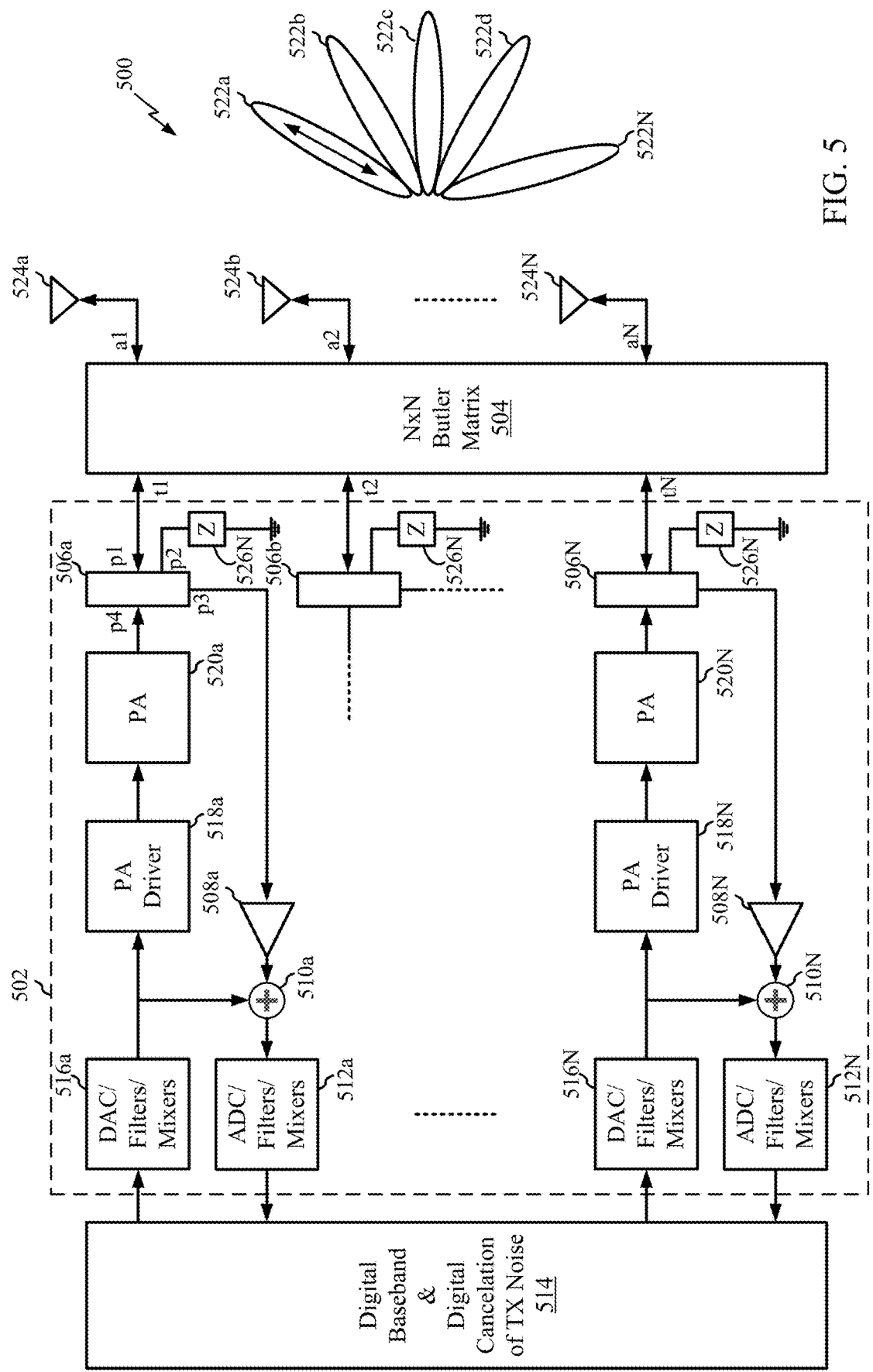
FIG. 5 is a block diagram conceptually illustrating a second transceiver with a Butler matrix beamformer, in accordance with certain aspects of the present disclosure.
Figure 6:
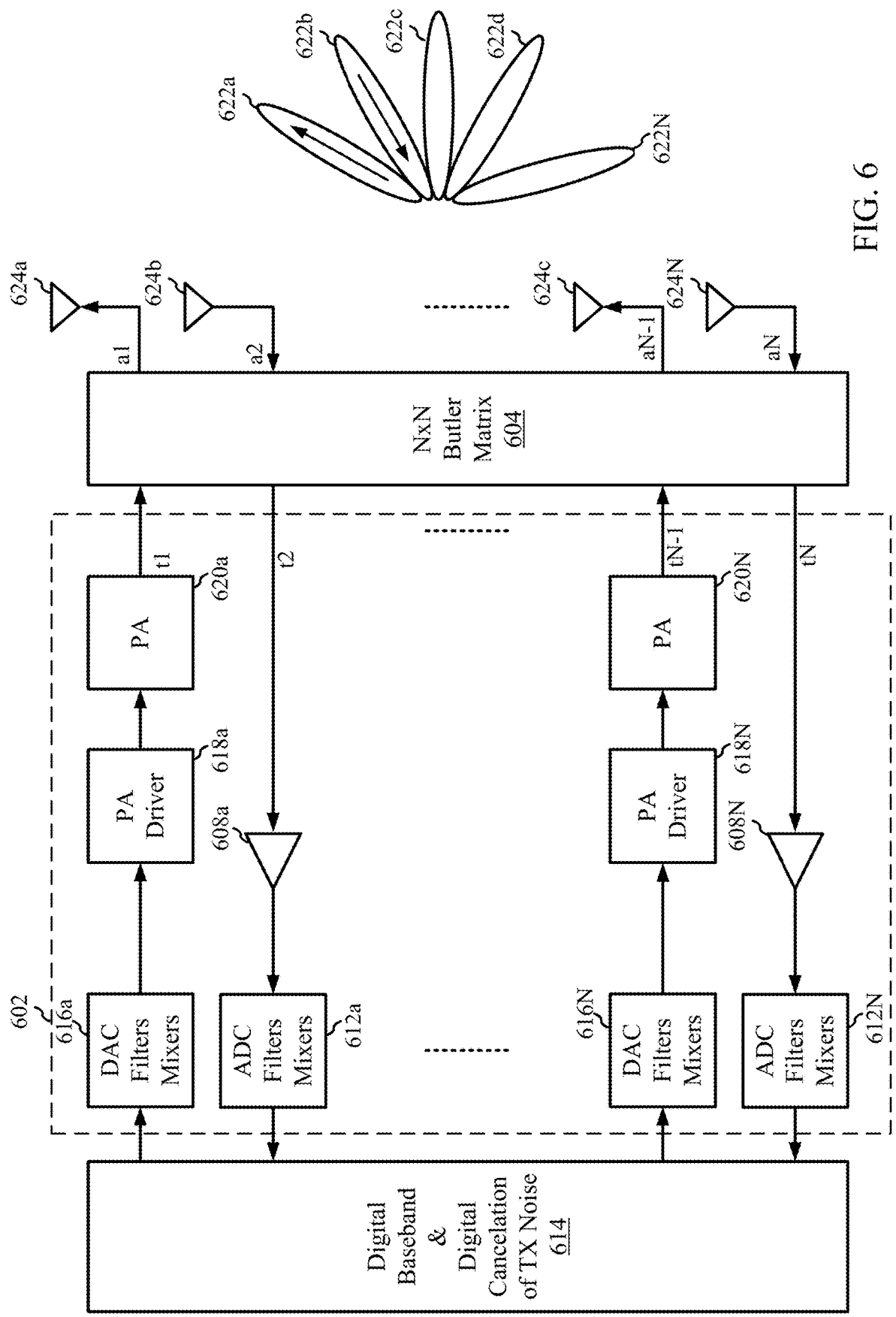
FIG. 6 is a block diagram conceptually illustrating a third transceiver with a Butler matrix beamformer, in accordance with certain aspects of the present disclosure.

The beamformer 300 may be connected to a transceiver configured to transmit and receive wireless communication signals. The transceiver may be connected to the transceiver terminals t1 to t4 as illustrated in FIGS. 4-6. Signals generated by the transceiver for transmission from the antenna terminals are passed to one of the four terminals t1 to t4. Each terminal t1 to t4 may be associated with a different spatial beam (e.g., corresponding to a different spatial direction) or virtual antenna, meaning depending on which terminal the signal is input into, the signal will be output over a corresponding spatial beam using antennas 314a-d.

As the Butler matrix beamformer 300 operates symmetrically it will be appreciated that the antennas 314a-d can also be used to receive signals at the same time as the antennas 314a-d transmit signals. In general for an N×N Butler matrix network consisting of N transceiver terminals and N antenna terminals, $(N/2) \log_2(N)$ couplers and $(N/2)(\log_2(N)-1)$ phase shifters are required. An N×N Butler matrix may generate N beams corresponding to N different beam angles.

It should be noted that each of the N outputs or antenna feeds generated by the N×N Butler matrix is a composite of the N signals input into the Butler matrix. Accordingly, as the value of N increases the matrix complexity increases and also the insertion loss may increase. A Butler matrix is typically implemented as part of an antenna feed network using micro-strip transmission lines laid out on a printed circuit board (PCB).

In certain aspects, the disclosure provides a transceiver coupled to an N×N Butler matrix beamformer. FIGS. 4-6 illustrate different example apparatuses for implementing a transceiver coupled to an N×N Butler matrix beamformer that are capable of full-duplex communication using beamforming. FIGS. 4 and 5 illustrate example apparatuses for communicating in full-duplex utilizing the Butler matrix beamformer for generating a single spatial beam to be used for both uplink signal reception and downlink signal transmission for a given wireless device using the same time and frequency resources. FIG. 6 illustrates an example apparatus for communicating in full-duplex utilizing the Butler matrix beamformer to generate two spatial beams, one to be used for downlink signal transmission and one to be used for uplink signal reception for a given wireless device using the same time and frequency resources. Accordingly, in certain aspects, systems and methods described herein provide low complexity, full-duplex communications using beamforming for one or more wireless devices.

Example Full-Duplex Transceiver with Non-Reciprocal Circulators

FIG. 4 is a block diagram conceptually illustrating a communication device 400 including a first transceiver 402 with a Butler matrix circuit configured for beamforming (Butler matrix beamformer 404), in accordance with certain aspects of the present disclosure.

The first transceiver 402 includes multiple circuit components configured for simultaneously transmitting and receiving wireless communication signals utilizing the same time and frequency resources over the same beam. Transceiver terminals t1-tN provide bi-directional signal communication between the beamformer 404 and the first full-duplex system 402. For example, the terminal t1 provides a path for signals (e.g., uplink communications from a UE 120) received at the antennas 424a-N coupled to the beamformer 404, to the first full-duplex system 402, and simultaneously provides a path for signals transmitted from the first full-duplex system 402 (e.g., downlink communications from a BS 110) over the same spatial beam (e.g., beam 422a) to the beamformer 404. In order to filter or separate the bidirectional signals from the single path of the terminal, the first full-duplex system 402 includes multiple duplexers, and in particular "circulators" 406a-N configured to communicate a radio-frequency signal entering any port to the next port in rotation. In one example, circulator 406a is a three-port (p1-3) circulator configured to receive and transmit signals via p1 connected to terminal t1. In this example, a signal received at p1 only passes (e.g., is severely attenuated out of any other port) out of p2, and a signal received at p3 only passes out of p1. A port in this context is a point where an external waveguide or transmission line (e.g., a micro-strip line or a coaxial cable), connects to the circulator 406a.

In one example, the circulator 406a directs a signal (e.g., an uplink signal received over beam 422a) received at p1 from terminal t1 to p2, where the uplink signal is passed to a low noise amplifier (LNA) 408a configured to amplify the relatively low power of the uplink signal. In certain aspects, the amplified uplink signal is passed to an analog interference cancelation device 410a configured to eliminate or reduce noise caused by the circulator 406a. In some examples, the circulator 406a may provide relatively low isolation (e.g., 40 dB) between the uplink signal and another signal (e.g., a downlink signal for transmission via terminal t1 over beam 422a) processed through the circulator 406a. Accordingly, an analog transmit signal is directed into the cancelation device 410a (e.g., an adder or subtractor) to cancel out echo and any other noise artifacts resulting from processing both the uplink signal and the downlink signal at the circulator 406a. After noise cancelation, the uplink signal is passed to block 412a which includes mixers, analog-to-digital converters, and filters for further processing of the uplink signal before being passed to the digital baseband 414 for digital cancelation of noise caused by the downlink signal.

The digital baseband 414 provides downlink signals that will be transmitted via beams or virtual antennas from the beamformer 404. For example, digital baseband 414 provide the downlink signal for transmission via terminal t1. Initially, the downlink signal is a digital signal directed into block 416a, which includes mixers, digital-to-analog converters, and filters, where the downlink signal is converted to an analog signal. From block 416a, the analog downlink signal is directed to the cancelation device 410a and a power amplifier (PA) driver 418a driving a high gain PA 420a. The amplified downlink signal is sent to p3 of the circulator, where the amplified downlink signal is processed with the uplink signal and output to the beamformer 404 via terminal t1 for beamformed transmission. Accordingly, the beamformer 404 can generate a single directional beam 422a using the antennas 424a-N for both transmitting the downlink signal and receiving the uplink signal at the same time using the same one or more frequency resources.

It should be noted that in certain aspects, the circulators 406a-N may include ferrimagnetic materials. However, in other configurations, the circulators 406a-N may include meta-materials. As used in this disclosure, a meta-material is a material characterized by tunable electrical permittivity and/or magnetic permeability. Generally, meta-materials are man-made and do not occur in nature, but are rather fabricated using nano-fabrication methods. It should also be noted that every component in the communication device 400 may be designed with meta-materials, including the antennas, switches, phase-shifters, couplers, filters and resonators, and oscillators.

Example Full-Duplex Transceiver with Branch-Line Couplers

FIG. 5 is a block diagram conceptually illustrating a communication device 500 including a second transceiver 502 with a Butler matrix beamformer 504, in accordance with certain aspects of the present disclosure. The second full-duplex system 502 is similar in certain aspects to the first full-duplex transceiver 402 shown in FIG. 4. For example, second transceiver 502 includes LNAs 508a-N, analog interference cancelation devices 510a-N (e.g., an adder or subtractor), blocks 512a-N which include mixers, analog-to-digital converters, and filters for further processing of a received signal (e.g., an uplink signal), a digital baseband 514, blocks 516a-N which include mixers, digital-to-analog converters, and filters for processing a signal to be transmitted (e.g., a downlink signal), PA drivers 518a-N, and PAs 520a-N. However, unlike the first transceiver 402, the second transceiver 502 includes multiple "branch-line couplers" 506a-N configured to split uplink signals and downlink signals into isolated parts as duplexers instead of circulators.

For example, terminal t1 provides a path for signals (e.g., uplink communications from a UE 120) received at the antennas 524a-N coupled to the beamformer 504, to the second full-duplex system 502, and simultaneously provides a path for signals to be transmitted from the second full-duplex system 502 (e.g., downlink communications from a BS 110) over the same spatial beam (e.g., beam 522a) to the beamformer 504. In order to filter or separate the bidirectional signals from the single path of t1, the second full-duplex system 502 includes multiple branch-line couplers 506a-N configured to split the uplink signal and the downlink signal into isolated parts. For example, the uplink signal received over beam 522a enters the branch-line coupler 506a through port p1 via t1, and then is divided equally between two output ports (p2 and p3). In some examples, port p3 is isolated from the other ports by an impedance 526a (e.g., 50 ohm termination). Port p4 is configured to receive the downlink signal for transmission over beam 522a via t1 from the PA 520a, which is output through p1. Accordingly, the beamformer 504 can generate a single directional beam 522a using the antennas 524a-N for both transmitting the downlink signal and receiving the uplink signal at the same time using the same one or more frequency resources.

A port in this context is a point where an external waveguide or transmission line (e.g., a micro-strip line or a coaxial cable), connects to the branch-line coupler 506a. It should be noted that while a single branch-line coupler 506 can be used at each terminal (t1-tN), other configurations are contemplated, including a single branch-line coupler with more or fewer ports, or multiple branch-line couplers at each terminal. It should also be noted that every component in the communication device 500 may be designed with meta-materials, including the antennas, switches, phase-shifters, couplers, filters and resonators, and oscillators.

Example Full-Duplex Transceiver with Separate Beams on Downlink and Uplink

FIG. 6 is a block diagram conceptually illustrating a communication device 600 including a third transceiver 602 with a Butler matrix beamformer 604, in accordance with certain aspects of the present disclosure. The third full-duplex system 602 is similar in certain aspects to the first and second transceivers 402, 502. For example, the third transceiver 602 includes LNAs 608a-N, blocks 612a-N which include mixers, analog-to-digital converters, and filters for further processing of a received signal (e.g., an uplink signal), a digital baseband 614, blocks 616a-N which include mixers, digital-to-analog converters, and filters for processing a signal to be transmitted (e.g., a downlink signal), PA drivers 618a-N, and PAs 620a-N.

However, the third full-duplex system 602 of FIG. 6 differs from those of FIGS. 4 and 5 in that it utilizes the beamformer 604 to generate separate beams (e.g., beam 622a and beam 622b) for communicating uplink signals and downlink signals using the same time and frequency resources. For example, beam 622a is used for reception of uplink signals, and beam 622b is used for transmission of downlink signals, such as at the same time using the same frequency resources. Accordingly, the uplink and downlink signals are isolated from each other, which results in a decrease in necessary circuit devices (e.g., no duplexers are required), and an increase in the number of antennas. For example, terminal t1 is configured to provide a path from the full-duplex system 602 to the beamformer 604 for a downlink signal received from the digital baseband 614 and to be transmitted over beam 622a. In an isolated path, terminal t2 is configured to provide a path from the beamformer 604 to the full-duplex system 602 for an uplink signal received from the antennas 624a-N coupled to the beamformer 604 over beam 622b. Moreover, by utilizing two spatially separate beams for full-duplex communication as described, multi-user full-duplex communication may be implemented utilizing ubiquitous semiconductor and PCB technology.

It should also be noted that every component in the communication device 600 may be designed with meta-materials, including the antennas, switches, phase-shifters, couplers, filters and resonators, and oscillators.

Figure 7:
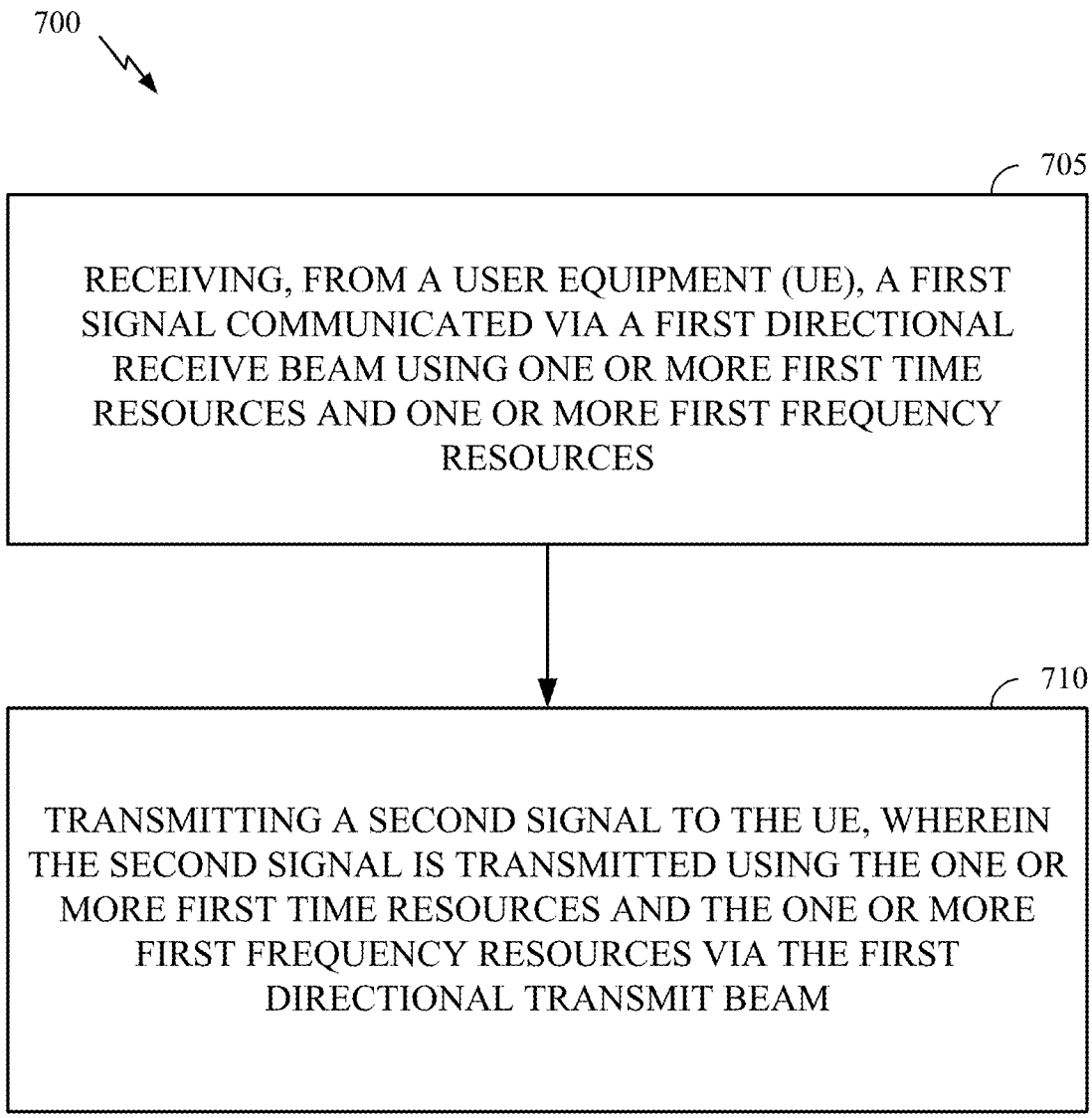
FIG. 7 is a flow chart illustrating a method of full-duplex, multi-user wireless transmission, in accordance with certain aspects of the present disclosure.

FIG. 7 is a flow diagram illustrating example operations 700 for wireless communication, in accordance with certain aspects of the present disclosure. The operations 700 may be performed, for example, by a BS (e.g., such as a BS 110 in the wireless communication network 100). Operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 may begin, at block 705, by receiving, from a UE, a first signal communicated via a first directional receive beam using one or more first time resources and one or more first frequency resources.

At block 710, the operations 700 proceed by transmitting a second signal to the UE, wherein the second signal is transmitted using the one or more first time resources and the one or more first frequency resources via a first directional transmit beam.

In certain aspects, the operations 700 further comprise generating the first directional receive beam and the first directional transmit beam utilizing Butler matrix beamforming.

In certain aspects, the first directional receive beam and the first directional transmit beam are spatially separated.

In certain aspects, the first directional receive beam and the first directional transmit beam are spatially collocated. In certain aspects, the operations 700 further include receiving, via a circuit, the second signal and the first signal, passing, via the circuit, the second signal to a plurality of branch-line quadrature couplers, performing, via the plurality of branch-line quadrature couplers, Butler matrix beamforming on the second signal to generate the first directional transmit beam, and passing, via the circuit, the first signal to an analog-to-digital converter. In certain aspects, the circuit comprises a duplexer. In certain aspects, the circuit comprises one or more of a meta-material or a material with tunable electric permittivity or permeability. In certain aspects, the operations 700 further include performing interference cancelation on the first signal to eliminate interference generated by the second signal at the circuit.

Figure 8:
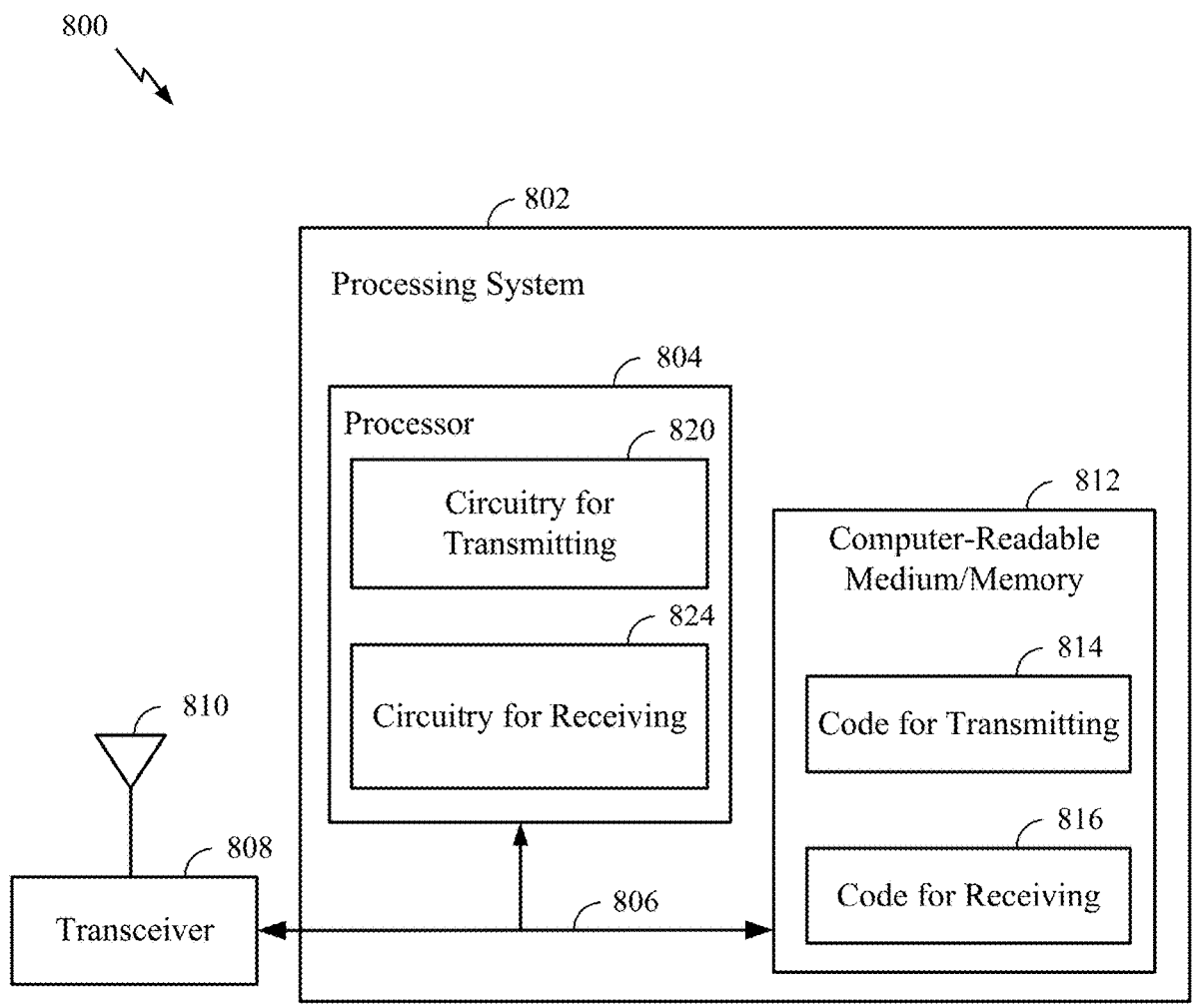
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 7. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 7, or other operations for performing the various techniques discussed herein. In certain aspects, computer-readable medium/memory 812 stores code for transmitting 814. The code for communicating 814 may operate in coordination with circuitry for transmitting 820 that includes one or more hardware components that provide the physical structure for performing various processes related to signal transmission, as described herein. In one example, the code for transmitting 814 and circuitry for transmitting 820 may transmit signals to a UE using a beam that is spatially separated or spatially collocated with a signal being received via the transceiver 808.

In certain aspects, computer-readable medium/memory 812 stores code for receiving 816. The code for receiving 816 may operate in coordination with circuitry for receiving 824 that includes one or more hardware components that provide the physical structure for performing various processes related to signal reception, as described herein. In one example, the code for receiving 816 and circuitry for receiving 824 may receive signals from a UE using a beam that is spatially separated or spatially collocated with a signal being transmitted via the transceiver 808.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Additional Considerations

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of full-duplex wireless communication operable at a base station (BS), comprising:
   receiving, from a user equipment (UE), a first signal communicated via a first directional receive beam using one or more first time resources and one or more first frequency resources;
   transmitting a second signal to the UE simultaneously with receiving the first signal, wherein:
      the second signal is transmitted using the one or more first time resources and the one or more first frequency resources via a first directional transmit beam;
      the first directional receive beam and the first directional transmit beam are spatially collocated; and
      the first directional receive beam and the first directional transmit beam comprise a spatial beam used for both uplink signal reception and downlink signal transmission for the UE;
   receiving, via a circuit having a duplexer, the second signal and the first signal;
   passing, via the circuit, the second signal to a plurality of branch-line couplers;
   performing, via the plurality of branch-line couplers, Butler matrix beamforming on the second signal to generate the first directional transmit beam;
   passing, via the circuit, the first signal to an analog-to-digital converter;
   performing analog interference cancelation on the first signal to eliminate interference generated by the second signal at the duplexer; and
   performing digital interference cancelation on the first signal to eliminate interference generated by the second signal at the circuit.

2. The method of claim 1, further comprising generating the first directional receive beam utilizing Butler matrix beamforming.

3. The method of claim 1, wherein the circuit comprises one or more of a meta-material or a material with tunable electric permittivity or permeability.

4. An apparatus for full-duplex wireless communication operable at a base station (BS), comprising:
a memory; and
a processor communicatively coupled to the memory, wherein the memory comprises instructions executable by the processor to cause the apparatus to:
receive, from a user equipment (UE), a first signal communicated via a first directional receive beam using one or more first time resources and one or more first frequency resources; and
simultaneously as the first signal is received, transmit a second signal to the UE, wherein:
the second signal is transmitted using the one or more first time resources and the one or more first frequency resources via a first directional transmit beam;
the first directional receive beam and the first directional transmit beam are spatially collocated;
the first directional receive beam and the first directional transmit beam comprise a spatial beam used for both uplink signal reception and downlink signal transmission for the UE;
receive, via a duplexer, the second signal and the first signal;
pass, via the duplexer, the second signal to a plurality of branch-line couplers;
perform, via the plurality of branch-line couplers, Butler matrix beamforming on the second signal to generate the first directional transmit beam;
pass, via the duplexer, the first signal to an analog-to-digital converter;
perform analog interference cancelation on the first signal to eliminate interference generated by the second signal at the duplexer via an analog interference cancelation device; and
perform digital interference cancelation on the first signal to eliminate interference generated by the second signal.

5. The apparatus of claim 4, further comprising a Butler matrix circuit configured to generate the first directional receive beam and the first directional transmit beam utilizing Butler matrix beamforming.

6. The apparatus of claim 5, wherein the Butler matrix circuit comprises the plurality of branch-line couplers, and wherein two or more of the plurality of branch-line couplers are communicatively coupled via a phase shifter circuit.

7. The apparatus of claim 6, wherein the Butler matrix circuit comprises one or more of a meta-material or a material with tunable electric permittivity or permeability.

8. The apparatus of claim 4, wherein the duplexer comprises a branch-line coupler.

9. The apparatus of claim 8, wherein the branch-line coupler comprises one or more of a meta-material or a material with tunable electric permittivity or permeability.

10. The method of claim 1, wherein the plurality of branch-line couplers comprise branch-line quadrature couplers.

11. The method of claim 1, wherein the duplexer comprises a branch-line coupler.

12. The method of claim 1, wherein the duplexer comprises a circulator.

13. The method of claim 1, wherein the duplexer comprises one or more of a meta-material or a material with tunable electric permittivity or permeability.

14. The apparatus of claim 4, wherein the plurality of branch-line couplers comprise branch-line quadrature couplers.

15. The apparatus of claim 4, wherein the duplexer comprises a circulator.

16. The apparatus of claim 4, wherein the duplexer comprises one or more of a meta-material or a material with tunable electric permittivity or permeability.

* * * * *